June 3, 1969
L. C. WILLIAMS ET AL
3,447,177
MECHANICAL WIRE STRIPPER
Filed Sept. 1, 1967
Sheet 1 of 2
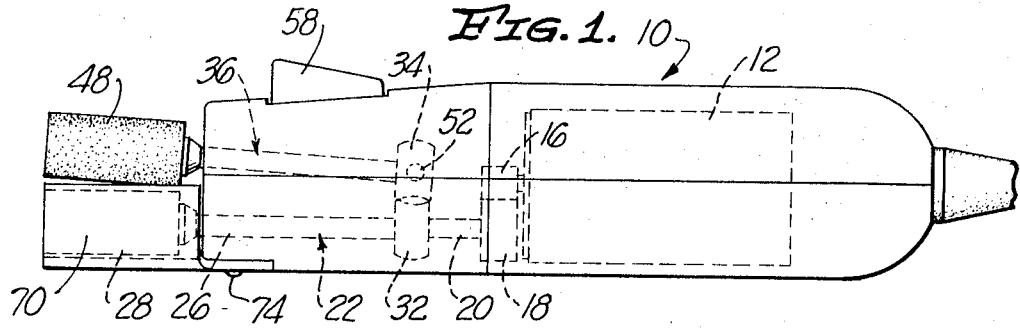
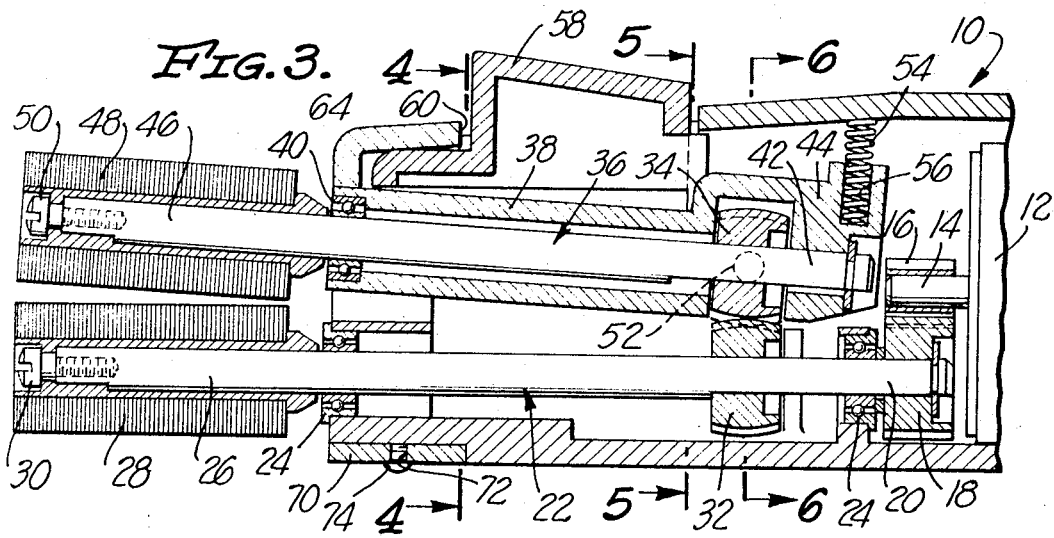
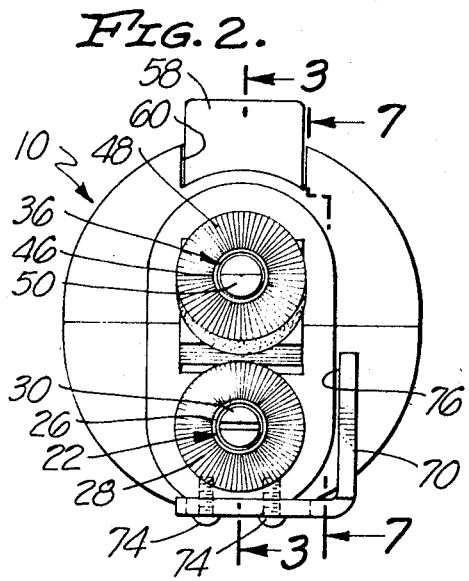
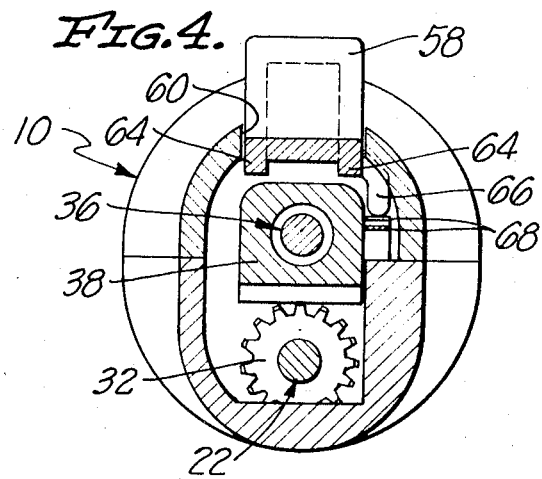
INVENTORS
LEE C. WILLIAMS,
BERTRAM F. BUTLER
BY
MAHONEY & HORNBAKER
ATTORNEYS

INVENTORS
LEE C. WILLIAMS,
BERTRAM F. BUTLER
BY
MAHONEY & HORNBAKER
ATTORNEYS

United States Patent Office 3,447,177
Patented June 3, 1969

3,447,177
MECHANICAL WIRE STRIPPER
Lee C. Williams, Pasadena, and Bertram F. Butler, Encinitas, Calif., assignors to Kinetics Corporation of California, Solana Beach, Calif., a corporation of California
Filed Sept. 1, 1967, Ser. No. 664,972
Int. Cl. A46b *13/00;* A47l *25/00;* H02g *1/12*
U.S. Cl. 15—23         16 Claims

ABSTRACT OF THE DISCLOSURE

A wire stripper having rotatable brush shafts mounting aligned brushes, one of said shafts being pivotal relative to the other to move said brushes toward and away from each other while axes of the shafts remain at all times in a single plane. A control member controls the movement of the brush shafts and simultaneously closes switch contacts to rotate the shafts and brushes when the shafts and brushes are moved together. A selectively adjustable guard is positioned radially adjacent the brushes limiting the length of a wire end that may be inserted between the brushes.

*Background of the invention*

This invention relates to a mechanical wire stripper of the type wherein a pair of brush shafts having aligned brushes thereon are rotatably mounted on a main frame, one of said brush shafts being movable toward and away from the other for stripping insulation and the like from a wire end inserted between said brushes from one side thereof. Furthermore, the brush shaft and brush movement is preferably in a particular unique and advantageous pattern, and may be controlled by unique control means which may simultaneously control actuation of switch means to rotate the brush shafts when the brushes are moved together. Also, a guard may be selectively adjustably mounted on the main frame extending radially spaced from one side of the brushes for limiting the length of the wire end that may be inserted between the brushes to thereby determine the length of said wire end that may be stripped.

Various prior forms of mechanical wire strippers have been provided wherein rotatable shafts having aligned brushes thereon have been supported movable toward and away from each other to thereby move the brushes thereon toward and away from each other. To our knowledge, all of the prior wire strippers of the foregoing character have been constructed for movement of the brush shafts toward and away from each other in an arcuate path of movement. As a result, due to the fragility of many of the wires being stripped, such arcuate path of movement of the shaft brushes together has caused distortion and bending of the wire ends being stripped.

Obviously, the purpose of stripping the wire ends of insulation and the like is to provide a wire end which is clean and will form a sound connection with an electrical device into which the particular wire is to be integrated. Prior to the connection of the stripped wire end to the electrical device, when the wire end is distorted and bent in said stripping operation, it is frequently necessary to provide an intermediate straightening operation prior to the final connecting operation. In modern high speed mass production, the necessity of adding such a straightening operation can be an important cost consideration in view of the additional time and labor involved.

Another lacking in the prior art devices of the general character herein involved, and particularly where the devices are of the hand tool form, is that such prior devices are normally provided with merely a conventional on-off switch for actuating the driving motor rotating the brush shafts and brushes. Thus, when the particular tool is in operation, the brushes are constantly rotating whether or not the device is carrying out a wire stripping operation. The inherent problems with such an arrangement are even more greatly magnified when it is considered that, in most cases, the rotating brushes are completely exposed.

There is the danger that someone or something can come into contact with the rotating brushes when the operator's attention is otherwise occupied and not directed to a wire stripping operation. Additionally, when the hand tool is put down, it is always necessary for the operator to turn the tool off and wait for the brushes to cease rotation. Both factors clearly present possible sources of danger, both to the operator and fellow workmen.

*Objects and summary of the invention*

It is, therefore, an object of our invention to provide a mechanical wire stripper of the general character hereinbefore discussed wherein the brush shafts are mounted movable toward and away from each other in a path of movement which virtually eliminates the danger of distortion and bending by the brushes of the wire end or ends being stripped. According to the present invention, one of the brush shafts is preferably pivotally mounted remote from the brushes for pivotal movement of the shafts and brushes toward and away from each other. The path of pivotal movement of said shafts is such that the axes thereof remain in a single plane throughout said movement, thereby eliminating the previously discussed arcuate movement of the prior art devices and virtually eliminating the danger of the brushes distorting or bending the wire ends.

It is a further object of our invention to provide a mechanical wire stripper of the general character hereinbefore discussed wherein shaft control means may be provided for controlling movement of the brush shafts and brushes toward and away from each other, and said shaft control means may also simultaneously and automatically control movement of switch means to rotate the shafts when moved together and terminate rotation thereof when moved apart. The shaft control means may be in the form of a depressible control member, moving the shafts together and operating the switch means during depression thereof, and permitting the shafts to move apart and releasing the switch means when said control member is released. Such arrangement, therefore, permits the brushes to remain stationary, except when an actual wire stripping operation is being carried out so as to eliminate the inherent dangers involved.

It is also an object of our invention to provide a mechanical wire stripper of the foregoing general character which may incorporate a guard extending radially spaced at one side of the brushes for limiting the length of a wire end which may be inserted between said brushes from the opposite sides thereof. In this manner, by inserting the wire ends between the brushes until the guard is contacted, the same predetermined length of wire end is stripped in each stripping operation. The guard may be selectively adjustably mounted so that the radial spacing thereof from the brushes may be selectively altered to adapt the wire stripper to a particular desired stripping operation.

Other objects and advantages of the invention will be apparent from the following specification and the accompanying drawings which are for the purpose of illustration only.

*Brief description of the drawings*

FIG. 1 is a fragmentary, side elevational view of a hand held wire stripper incorporating the principles of the present invention and with the rotatable brushes thereof spaced apart and stationary;

FIG. 2 is an enlarged, end elevational view of the wire stripper of FIG. 1 looking at the left-hand end of FIG. 1;

FIG. 3 is a fragmentary, vertical, sectional view taken along the broken line 3—3 in FIG. 2;

FIG. 4 is a vertical, sectional view taken along the broken line 4—4 in FIG. 3;

*Description of the best embodiment contemplates*

Figure 5:
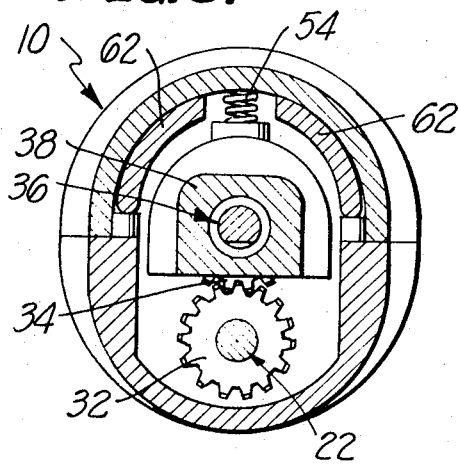
FIG. 5 is a vertical, sectional view taken along the broken line 5—5 in FIG. 3.
Figure 6:
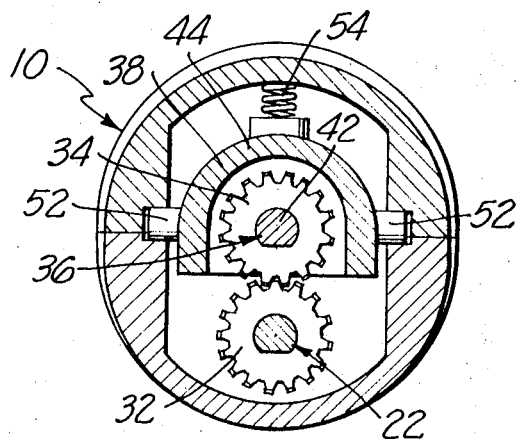
FIG. 6 is a vertical, sectional view taken along the broken line 6—6 in FIG. 3.

Referring to the drawings, the embodiment of the mechanical wire stripper of the present invention includes a main frame or housing, generally indicated at 10, enclosing a conventional electric drive motor 12 in a rearward portion thereof, said drive motor having the usual drive shaft 14. A drive gear 16 is secured on the drive shaft 14 rotatable therewith, with the drive gear being preferably engaged for in turn rotating a driven gear 18 secured to a rearward end 20 of a first brush shaft, generally indicated at 22.

The first brush shaft 22 is rotatably mounted in the housing 10 through a pair of axially spaced bearings 24, with a forward end 26 of said first brush shaft projecting outwardly beyond the housing. A usual stripping brush 28 is mounted on the forward end 26 of the first brush shaft 22 removably secured thereto by a fastening screw 30 for rotation with said shaft. Furthermore, a secondary drive gear 32 is secured to the first brush shaft 22 immediately forward of said shaft rearward end 20 and is engaged with a secondary driven gear 34 secured to a second brush shaft 36.

The second brush shaft 36 is rotatably mounted within a shaft support frame 38 through a bearing 40 and a rearward end 42 of said shaft rotatably received in a rearward portion 44 of the shaft support frame, as best seen in FIG. 3. A forward end 46 of the second brush shaft 36 also projects from the housing 10 and has a stripping brush 48 secured thereto rotatable therewith through a fastening screw 50. The stripping brush 48 of the second brush shaft 36 is generally aligned with the stripping brush 28 of the first brush shaft 22 for radial meshing of said brushes upon movement of said shafts radially together, as will be hereinafter more fully described.

Figure 7:
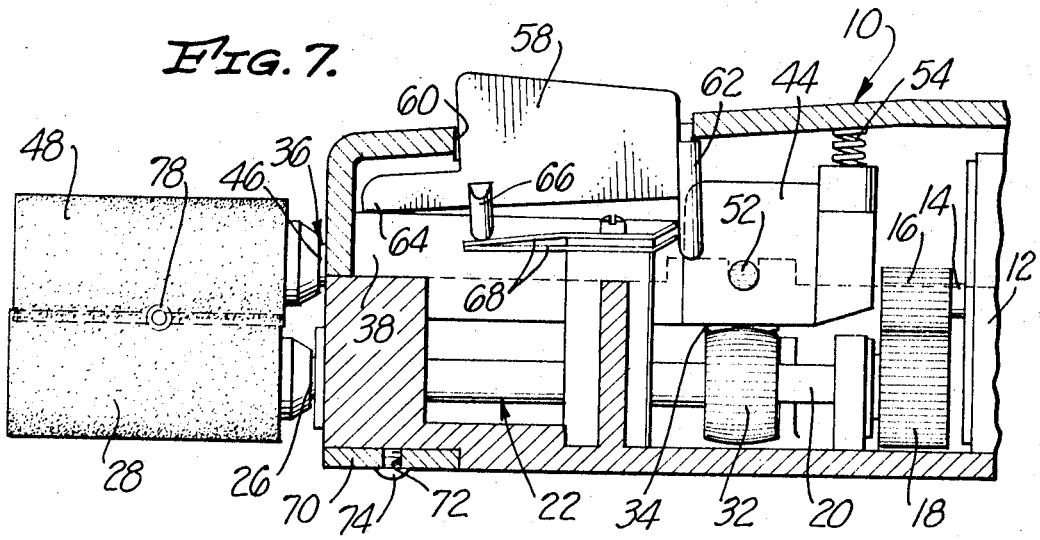
FIG. 7 is a vertical, sectional view taken along the broken line 7—7 in FIG. 2, but with the brush shafts and brushes moved together and rotating performing a wire stripping operation on a wire end positioned therebetween.
Figure 8:
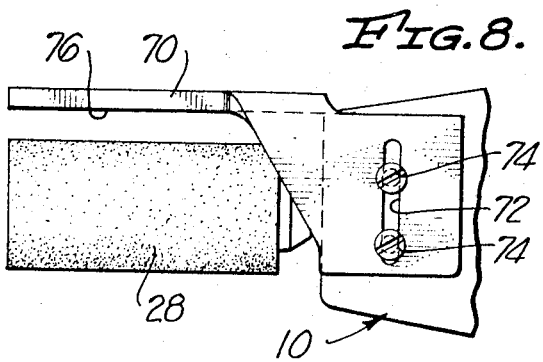
FIG. 8 is an enlarged, fragmentary, bottom plan view of the left-hand end of the wire stripper of FIG. 1.

The shaft support frame 38 is mounted pivotal within the housing 10 through a pair of oppositely transversely depending and axially aligned pivot pins 52 secured in the rearward portion 44 of the shaft support frame and pivotally received in the housing, as best seen in FIGS. 1, 3, 6 and 7. As shown, the pivot axis of the pivot pins 52 is normal to and intersects the coinciding axes of the secondary driven gear 34 and the second brush shaft 36. Furthermore, the axis of the pivot pins 52 is axially midway of the secondary driven gear 34, and the engaging peripheries of the secondary drive and driven gears 32 and 34 are formed arcuate, as best seen in FIGS. 1, 3 and 7, so that said gears will remain engaged for transmitting rotatable drive therebetween despite upward and downward pivotal movement of the second brush shaft 36 toward and away from the first brush shaft 22.

Thus, the second brush shaft 36 is radially pivotal toward and away from the first brush shaft 22 to move the stripping brush 48 radially toward and away from the stripping brush 28. Such pivotal movement is provided by the mounting of the second brush shaft 36 rotatably within the shaft support frame 38 and the pivotal connection of said shaft support frame rearwardly remote from the stripping brush 48 to the housing 10 through the pivot pins 52. Important to certain of the principles of the present invention is the fact that, due to the particular pivotal mounting described, the pivotally movable axis of the second brush shaft 36 remains at all times in a single plane, which is the same plane of the stationary axis of the first brush shaft 22.

As a result, viewing the stripping brushes 28 and 48 from the forward end, as shown in FIG. 2, the brushes will always be moved toward and away from each other in a single vertical plane or straight path as opposed to the arcuate paths of the prior art devices, as hereinbefore discussed. There is no danger, therefore, of distorting or bending a wire end inserted transversely between said brushes 28 and 48 when said brushes are moved pivotally together to intermesh as has been prevalent in the prior art devices.

The second brush shaft 36 is normally resiliently urged to pivot upwardly away from the first brush shaft 22 so as to move the stripping brush 28 pivotally upwardly away from the stripping brush 48 to separate said brushes and place them in the position shown in FIGS. 1, 2 and 3, by a compression spring 54 received in a socket 56 formed in the rearward portion 44 of the shaft support frame 38, engaged between said shaft support frame and the main frame or housing 10. A shaft control button 58 is received through an appropriate opening 60 of the housing 10 pivotal on said housing through rear side flanges 62, as best seen in FIG. 5, and downwardly engageable with the shaft support frame 38 through forward side flanges 64, as best seen in FIGS. 3, 4 and 7. A switch actuating lever 66 is formed on the shaft control button 58 extending downwardly transversely adjacent the shaft support frame 38, as best seen in FIGS. 4 and 7, said lever being downwardly engageable with an upper of a pair of vertically spaced, resilient switch contact plates 68 for controlling electrical power to the drive motor 12.

Thus, the first and second brush shafts 22 and 36 with the stripping brushes 28 and 48 will normally be resiliently urged apart by the compression spring 54 wherein the switch contact plates 68, through the inherent resiliency thereof and the lack of depression by the switch actuating lever 66, will likewise be spaced apart in a motor nonactuating position, as shown in FIGS. 3 and 4. Upon depression of the shaft control button 58, however, the second brush shaft 36 will be moved downwardly toward the first brush shaft 22, bringing the stripping brushes 28 and 48 radially together for intermeshing thereof, and at the same time, the switch actuating lever 66 will engage the upper of the switch contact plates 68 and force said switch contact plates together into a motor actuating position, thereby actuating the drive motor 12 to rotate the stripping brushes in opposite rotational directions in the usual manner. Release of the shaft control button 58 will automatically return the stripping brushes 28 and 48 to their spaced apart condition, as well as release the switch contact plates 68 for movement from the motor actuating to the motor nonactuating position.

A guard 70 for limiting the length of a wire end that may be inserted between the stripping brushes 28 and 48 is selectively, adjustably secured to the housing 10 through a slot 72 and fastening screws 74, as best seen in FIGS. 1, 2, 3, 7 and 8. The guard 70 extends upwardly radially spaced from and alongside of the stripping brushes 28 and 48, that is, selectively, adjustably spaced from the line of contact between said stripping brushes. Furthermore, the guard 70 is formed with an abutment 76 for abutment by the extremities of wire ends inserted transversely between the stripping brushes 28 and 48 so as to determine and limit the length of said wire ends which will be stripped by the stripping brushes.

Obviously, the abutment surface 76 on the guard 70 may be selectively moved radially toward and away from the stripping brushes 28 and 48 by partially releasing the fastening screws 74 and sliding the guard transversely along the slot 72. In this manner, the limitation of the guard abutment surface 76 may be selectively adjusted to any particular length of wire end to be stripped and to suit the particular operation.

In operation of the mechanical wire stripper of the present invention, with the shaft control button 58 released and the stripping brushes 28 and 48 spaced apart in the manner shown in FIGS. 1, 2 and 3, a wire end 78 (FIG. 7) may be inserted transversely between said brushes until it abuts the guard abutment surface 76. The shaft control button 58 is then depressed, moving the stripping brushes 28 and 48 radially together to intermesh, as shown in FIG. 7, and surround the wire end 78. At the same time, the depression of the shaft control button 58 moves the switch contact plates 68 from spaced apart in nonactuating position to abutting in actuating position, as also shown in FIG. 7.

Upon the movement together of the stripping brushes 28 and 48, therefore, the drive motor 12 is simultaneously actuated to rotate said brushes against the wire end 78 beginning the stripping operation. Withdrawal of the wire end 78 thereafter then completes the stripping operation, and the shaft control button 58 is released to return the stripping brushes 28 and 48 to their spaced apart position and terminating rotation thereof by ceasing actuation of the drive motor 12. The wire stripper is then ready for a repeat of a wire stripping operation according to the same procedure.

Thus, according to the principles of the present invention, we have provided a mechanical wire stripper wherein the danger of distorting or bending the wire ends, such as the wire end 78, is completely eliminated by providing the stripping brushes 28 and 48 movable radially toward and away from each other, with the axes thereof maintained in a single plane. Additionally, we have provided a mechanical wire stripper wherein the movement of the stripping brushes 28 and 48 is controlled by a single shaft control button 58, which, simultaneously, actuates the drive motor 12 to rotate said brushes during movement together and deactuates the drive motor upon movement of said brushes apart. Still further, we have provided a mechanical wire stripper having a selectively adjustable guard 70 thereon positioned for determining and limiting the length of a wire end 78 that may be inserted transversely between the stripping brushes 28 and 48, said guard being selectively adjustable to change said wire end length limitation to conform to any particular desired operatng conditions.

We claim:

1. In a wire stripper of the type having in combination: a main frame; first and second brush shafts rotatable about axes thereof on said main frame; aligned brushes on said brush shafts rotatable therewith; shaft support means operably mounting at least said second brush shaft movable on said main frame radially toward and away from said first brush shaft and said brushes toward and away from each other; and drive means for rotating said brush shafts at least when said brushes are closely radially adjacent one another; the improvements comprising: said shaft support means including a shaft support frame, means operably connecting said shaft support frame to said main frame with said brush shaft axes extending in a single plane and said brush shaft axes maintained in said single plane throughout said movement of said second brush shaft toward and away from said first brush shaft; and said means operably connecting said shaft support frame to said main frame including means pivotally connecting said shaft support frame to said main frame remote from said shaft brushes for pivotal movement of said second brush shaft toward and away from said first brush shaft.

2. A wire stripper as defined in claim 1 in which said first brush shaft is rotatably mounted on said frame with the axis of said shaft retained stationary: and in which said brushes are mounted on said brush shafts at ends of said shafts.

3. A wire stripper as defined in claim 1 in which said drive means includes a drive motor, switch means on said main frame movable between a nonactuating position free of actuating said drive motor and an actuating position actuating said drive motor to rotate said brush shafts and brushes; and in which shaft control means is selectively movable on said main frame for controlling pivotal movement of said shaft support frame and thereby movement of said second brush shaft radially toward and away from said first brush shaft, said shaft control means simultaneously automatically controlling movement of said switch means from nonactuating to actuating position during said movement of said brushes toward one another and from actuating to nonactuating position during movement of said brushes away from one another.

4. A wire stripper as defined in claim 1 in which said first brush shaft is rotatably mounted on said main frame with the axis thereof maintained stationary; in which said brushes are mounted on ends of said brush shafts; in which resilient means is operably connected between said shaft support frame and said main frame for resiliently urging said second brush shaft away from said first brush shaft; in which said drive means includes a drive motor, switch means on said main frame movable between a nonactuating position free of actuating said drive motor and an actuating position actuating said motor to rotate said brush shafts and brushes; and in which shaft control means is selectively movable on said main frame for controlling pivotal movement of said shaft support frame and thereby movement of said second brush shaft toward and away from said first brush shaft, said shaft control means simultaneously automatically controlling movement of said switch means from nonactuating to actuating position during said movement of said brushes toward one another and from actuating to nonactuating position during movement of said brushes away from one another.

5. A wire stripper as defined in claim 1 in which said first brush shaft is rotatably mounted on said main frame with the axis thereof maintained stationary; in which said brushes are mounted on ends of said brush shafts; in which resilient means is operably connected between said shaft support frame and said main frame for resiliently urging said second brush shaft away from said first brush shaft; in which said drive means includes a drive motor, a pair of switch contact means operably connected to said main frame normally resiliently urged apart in a nonactuating position free of actuating said drive motor and movable together into an actuating position actuating said motor to rotate said brush shafts and brushes; and in which shaft control means is selectively movable on said main frame for controlling pivotal movement of said shaft support frame and thereby movement of said second brush shaft toward and away from said first brush shaft, said shaft control means simultaneously automatically controlling movement of said switch contact means forcing said switch contact means from nonactuating to actuating position during said movement of said brushes toward one another and permitting movement of said switch contact means from actuating to nonactuating position during movement of said brushes away from one another.

6. A wire stripper as defined in claim 1 in which said first brush shaft is rotatably mounted on said main frame with the axis thereof maintained stationary; in which said brushes are mounted on ends of said brush shafts; in which resilient means is operably connected between said shaft support frame and said main frame for resiliently urging said second brush shaft away from said first brush shaft; in which said drive means includes a drive motor, a pair of switch contact means operably connected to said main frame normally resiliently urged apart in a nonactuating position free of actuating said drive motor and movable together into an actuating position actuating said motor to rotate said brush shafts and brushes; in which shaft control means is selectively movable on said main frame for controlling pivotal movement of said shaft support frame and thereby movement of said second brush shaft toward and away from said first brush shaft, said control means simultaneously automatically controlling movement of said switch contact means forcing said switch contact means from nonactuating to actuating position during said movement of said brushes toward one another and permitting movement of said switch contact means from actuating to nonactuating position during movement of said brushes away from one another; and in which a guard is operably connected to said main frame and extends spaced radially at one side of said brushes, said guard having abutment surface means positioned for contact by an end of a wire inserted from an opposite side of said brushes between said brushes to thereby limit the length of said wire end contacted and stripped by said brushes, adjustable means between said guard and said main frame for selective adjustment of said guard radially relative to said brushes to thereby selectively vary the position of said abutment surface means and said limit on said length of said wire end contacted and stripped by said brushes.

7. In a wire stripper of the type having in combination: a main frame; first and second brush shafts rotatable about axes thereof on said main frame; aligned brushes on said brush shafts rotatable therewith; shaft support means operably mounting at least said second brush shaft movable on said main frame radially toward and away from said first brush shaft and said brushes toward and away from each other; and drive means for rotating said brush shafts at least when said brushes are closely radially adjacent one another; the improvements comprising: said drive means including a drive motor, switch means on said main frame movable between a nonactuating position free of actuating said drive motor and an actuating position actuating said motor to rotate said brush shafts and brushes; and shaft control means selectively movable on said main frame for controlling movement of at least said second brush shaft radially toward and away from said first brush shaft, said shaft control means simultaneously automatically controlling movement of said switch means from nonactuating to actuating position during said movement of said brushes toward one another and from actuating to nonactuating position during movement of said brushes away from one another.

8. A wire stripper as defined in claim 7 in which certain of said shaft support means, switch means and shaft control means have resilient means operably associated therewith normally resiliently urging said brush shafts and brushes away from each other and normally resiliently urging said switch means to nonactuating position.

9. A wire stripper as defined in claim 7 in which said switch means includes a pair of resilient contact strips normally resiliently urged spaced apart into said nonactuating position and movable together into said actuating position by said shaft control means upon said shaft control means moving said brush shafts and brushes together.

10. A wire stripper as defined in cliam 7 in which said shaft control means includes a depressible control member controlling movement of said brush shafts and brushes together upon depression thereof and controlling movement of said brush shafts and brushes apart upon release thereof, said depressible control member simultaneously automatically controlling movement of said switch means from nonactuating to actuation position during depression thereof and from actuating to nonactuating position during release thereof; and in which certain of said shaft support means, switch means and depressible control member have resilient means operably associated therewith normally resiliently urging said brush shafts and brushes apart and normally resiliently urging said switch means to said nonactuating position.

11. A wire stripper as defined in claim 7 in which said shaft control means includes a depressible control member operably connected to said shaft support means for moving said second brush shaft radially toward said first brush shaft upon depression thereof and permitting movement of said second brush shaft radially away from said first brush shaft upon release thereof, said depressible control member also being operably connected to said switch means for movement of said switch means from nonactuating to actuating position upon depression thereof and permitting movement of said switch means from actuating to nonactuating position upon release thereof; in which resilient means is operably connected between said shaft support means and said main frame for normally resiliently urging said shaft support means and thereby said second brush shaft radially away from said first brush shaft; and in which said switch means includes contact means normally resiliently urged apart to said switch means nonactuating position, said contact means being movable together to said switch means actuating position by said depresssible control member upon depression thereof and being permitted to move apart to said switch means nonactuating position upon release of said depressible control member.

12. In a wire stripper of the type having in combination: a main frame; first and second brush shafts rotatable about axes thereof on said main frame; aligned brushes on said brush shafts rotatable therewith; shaft support means operably mounting at least said second brush shaft movable on said main frame radially toward and away from said first brush shaft and said brushes toward and away from each other; and drive means for rotating said brush shafts at least when said brushes are closely radially adjacent one another; the improvements comprising: a guard operably connected to said main frame and extending spaced radially at one side of said brushes, said guard having abutment surface means positioned for contact by an end of a wire inserted from an opposite side of said brushes between said brushes to thereby limit the length of said wire end contacted and stripped by said brushes.

13. A wire stripper as defined in claim 12 in which adjustment means operably connects said guard to said main frame for selectively varying the distance of said guard abutment surface from said one side of said brushes to thereby selectively vary said limit of said length of said wire end contacted and stripped by said brushes.

14. A wire stripper as defined in claim 12 in which said guard includes a plate extending spaced radially at one side of said brushes and having said abutment surface means radially facing said brushes, adjustment means operably connecting said plate to said main frame for selectively varying the radial distance between said plate and said brushes to thereby vary the radial distance between said abutment surface means and said brushes.

15. In a wire stripper of the type having in combination: a main frame; first and second brush shafts rotatable about axes thereof on said main frame; aligned brushes on said brush shafts rotatable therewith; shaft support means operably mounting at least said second brush shaft movable on said main frame radially toward and away from said first brush shaft and said brushes toward and away from each other; and drive means for rotating said brush shafts at least when said brushes are closely radially adjacent one another; the improvements comprising: said shaft support means including a shaft support frame, means operably connecting said shaft support frame to said main frame with said brush shaft axes extending in a single plane and said brush shaft axes maintained in said single plane throughout said movement of said second brush shaft toward and away from said first brush shaft; said drive means including a drive motor, switch means on said main frame movable between a nonactuating position free of actuating said drive motor and an actuating position actuating said motor to rotate said brush shafts and brushes; and shaft control means selectively movable on said main frame for controlling movement of said shaft support frame and thereby movement of said second brush shaft radially toward and away from said first brush shaft, said shaft control means simultaneously automatically controlling movement of said switch means from nonactuating to actuating position during said movement of said brushes toward one another and from actuating to nonactuating position during movement of said brushes away from one another.

16. In a wire stripper of the type having in combination: a main frame; first and second brush shafts rotatable about axes thereof on said main frame; aligned brushes on said brush shafts rotatable therewith; shaft support means operably mounting at least said second brush shaft movable on said main frame radially toward and away from said first brush shaft and said brushes toward and away from each other; and drive means for rotating said brush shafts at least when said brushes are closely radially adjacent one another; the improvements comprising; said support means including a shaft support frame, means operably connecting said shaft support frame to said main frame with said brush shaft axes extending in a single plane and said brush shaft axes maintained in said single plane throughout said movement of said second brush shaft toward and away from said first brush shaft; and a guard operably connected to said main frame and extending spaced radially at one side of said brushes, said guard having abutment surface means positioned for contact by an end of a wire inserted from an opposite side of said brushes between said brushes to thereby limit the length of said wire end contacted and stripped by said brushes.

References Cited

UNITED STATES PATENTS

| 718,549 | 1/1903 | Van Auken | 15—88 |
| 2,225,200 | 12/1940 | Ames. | |
| 2,619,663 | 12/1952 | Johnson et al. | 15—88 |
| 2,962,739 | 12/1960 | Schoch | 15—23 |

FOREIGN PATENTS

| 674,645 | 4/1939 | Germany. |

EDWARD L. ROBERTS, *Primary Examiner.*

U.S. Cl. X.R.

15—88; 81—9.51